(12) United States Patent
Takata et al.

(10) Patent No.: US 7,049,361 B2
(45) Date of Patent: *May 23, 2006

(54) POLYOLEFIN SERIES RESINFILM, COMPOSITION FOR PREPARING THE SAME, PROCESS FOR PREPARING THE COMPOSITION FOR PREPARING THE SAME, AND APPARATUS FOR PREPARING THE SAME

(75) Inventors: Atsuhiro Takata, Toyonaka (JP); Ryuma Kuroda, Ibaraki (JP); Satoshi Hanada, Ibaraki (JP); Takeshi Yamada, Takatsuki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 255 days.

This patent is subject to a terminal disclaimer.

(21) Appl. No.: 10/093,534

(22) Filed: Mar. 11, 2002

(65) Prior Publication Data

US 2002/0149132 A1 Oct. 17, 2002

(30) Foreign Application Priority Data

Mar. 14, 2001 (JP) .............................. 2001-072179
Mar. 30, 2001 (JP) .............................. 2001-098857

(51) Int. Cl.
*C08L 5/01* (2006.01)

(52) U.S. Cl. ................. 524/474; 524/477; 524/487; 524/490; 524/570; 524/582; 524/583; 524/585; 524/587; 525/240

(58) Field of Classification Search ................ 524/848, 524/474, 487, 490, 477, 582, 583, 585, 587, 524/570

See application file for complete search history.

(56) References Cited

U.S. PATENT DOCUMENTS

| | | | | |
|---|---|---|---|---|
| 3,382,536 A | | 5/1968 | Fritsch et al. | |
| 4,087,505 A | * | 5/1978 | Sugimoto et al. | 264/564 |
| 4,230,831 A | | 10/1980 | Sakurai et al. | |
| 4,237,037 A | * | 12/1980 | Takahashi | 524/277 |
| 4,737,547 A | * | 4/1988 | White | 525/193 |
| 5,141,801 A | * | 8/1992 | Takeshita et al. | 428/348 |
| 5,155,160 A | * | 10/1992 | Yeh et al. | 524/487 |
| 5,728,337 A | | 3/1998 | Yoshikawa et al. | |
| 5,728,754 A | * | 3/1998 | Lakshmanan et al. | 523/173 |
| 5,851,065 A | | 12/1998 | Ikeda et al. | |
| 6,033,514 A | * | 3/2000 | Davis et al. | 156/244.11 |
| 6,059,860 A | * | 5/2000 | Larson | 95/117 |
| 6,414,047 B1 | * | 7/2002 | Abe | 521/142 |
| 6,749,961 B1 | * | 6/2004 | Nguyen et al. | 429/145 |
| 2002/0034689 A1 | * | 3/2002 | Hoshida et al. | 429/254 |
| 2002/0149132 A1 | * | 10/2002 | Takata et al. | 264/210.6 |
| 2002/0156167 A1 | * | 10/2002 | Takata et al. | 524/423 |
| 2003/0100650 A1 | * | 5/2003 | Hada et al. | 524/425 |

FOREIGN PATENT DOCUMENTS

| | | |
|---|---|---|
| EP | 0 364 634 A1 | 4/1990 |
| EP | 1 168 469 A2 | 1/2002 |
| JP | 10-193451 A | 7/1998 |
| WO | WO 91/08262 A2 * | 6/1991 |

OTHER PUBLICATIONS

JP 11-106533 (abstract in English).*

* cited by examiner

*Primary Examiner*—Ling-Sui Choi
*Assistant Examiner*—Rip A Lee
(74) *Attorney, Agent, or Firm*—Sughrue Mion, PLLC

(57) ABSTRACT

The polyolefin [A] has a weight average molecular chain length of 2850 nm or longer and a density $\rho 1$ (g/cm$^3$), the polyolefin wax [B] has a weight average molecular weight of 700–6000 and a density $\rho 2$ (g/cm$^3$), the polyolefin and the polyolefin wax are incorporated at [A]/[B]=90/10–50/50 (ratio by weight), and the densities $\rho 1$ and $\rho 2$ satisfy the following conditions: $0.92 \leq \rho 1 \leq 0.94$, $0.91 \leq \rho 2 \leq 0.93$, $-0.03 \leq (\rho 1 - \rho 2) \leq 0.03$.

10 Claims, 4 Drawing Sheets

(a)

(b)

POLYOLEFIN SERIES RESIN FILM, COMPOSITION FOR PREPARING THE SAME, PROCESS FOR PREPARING THE COMPOSITION FOR PREPARING THE SAME, AND APPARATUS FOR PREPARING THE SAME

BACKGROUND OF THE INVENTION

1. Field of the Invention

The present invention relates to the techniques of a polyolefin series resin, more particularly, a polyolefin series resin film, a composition for preparing the same, a process for preparing the composition for preparing the same, and an apparatus for preparing the same.

2. Description of the Related Art

As one of materials for high strength and high elasticity films, ultra-high molecular-weight-polyolefin is known. This ultra-high molecular-weight-polyolefin has the high melt viscosity due to its high molecular weight, and film formation such as thinning and drawing is difficult. For that reason, commercially available ultra-high molecular-weight-polyolefin films are generally prepared by a method by slicing a block-like resin.

However, although a film can be obtained by slicing ultra-high molecular-weight-polyolefin, the thickness precision is deteriorated, a part having the low strength and elasticity is locally generated and, thus, it is difficult to prepare a high strength and high elasticity film.

SUMMARY OF THE INVENTION

An object of the present invention is to provide a high strength and high elasticity polyolefin series resin film as well as a composition for preparing a high strength and high elasticity polyolefin series resin film.

Another object of the present invention is to provide a screw kneading apparatus for preparing a resin composition having the high elasticity which hardly produces defects such as hole and breakage when molded into a film and drew, and a process for preparing a composition for preparing a resin using the same.

The present inventors intensively study in order to develop a high elasticity polyolefin series resin film and, as a result, found that the aforementioned problems can be solved by using a composition obtained by mixing polyolefin having a specific molecular chain length and polyolefin wax at a specific ratio, which resulted in completion of the present invention.

That is, a polyolefin series resin film of the present invention is characterized in that:

polyolefin [A] having a weight average molecular chain length of 2850 nm or longer and a density $\rho 1$ (g/cm$^3$) and polyolefin wax [B] having a weight average molecular weight of 700–6000 and a density $\rho 2$ (g/cm$^3$) are incorporated at [A]/[B]=90/10–50/50 (ratio by weight) and $\rho 1$ and $\rho 2$ satisfy the following conditions:

$$0.92 \leq \rho 1 \leq 0.94$$

$$0.91 \leq \rho 2 \leq 0.93$$

$$-0.01 \leq (\rho 1 - \rho 2) \leq 0.03.$$

When [A]/[B] exceeds 90/10 so as to heighten a ratio of polyolefin [A], the processability is deteriorated and a ratio of polyolefin wax [B] is increased. When [A]/[B] is less than 50/50, the physical properties of the resulting film is decreased.

In addition, a composition for preparing a polyolefin series resin film of the present invention is characterized in that:

polyolefin [A] having a weight average molecular chain length of 2850 nm or longer and a density $\rho 1$ (g/cm$^3$) and polyolefin wax [B] having a weight average molecular weight of 700–6000 and a density $\rho 2$ (g/cm$^3$) are incorporated at [A]/[B]=90/10–50/50 (ratio by weight) and $\rho 1$ and $\rho 2$ satisfy the following conditions:

$$0.92 \leq \rho 1 \leq 0.94$$

$$0.91 \leq \rho 2 \leq 0.93$$

$$-0.01 \leq (\rho 1 - \rho 2) \leq 0.03.$$

Further, a screw kneading apparatus of the present invention comprises:

a barrel, a screw, said screw being provided in the barrel and being provided with at least a full flight screw and a kneading block and having L/D of 30 or larger, wherein the kneading block has $L_n/D$ of 5 or larger, and the full flight screw has $L_f/D$ of 3 or larger and satisfies the following equations:

$$35 \leq \alpha \leq 60$$

$$0.15 \leq (M/D) \leq 0.25,$$

wherein $\alpha$ is a flight angle (°) of a full flight screw, M is a depth (mm) of a screw groove of a full flight screw, L is a screw full length (mm), $L_n$ is a total length (mm) of a kneading block, $L_f$ is a total length (mm) of a full flight screw and D is a diameter (mm) of a barrel.

The present inventors intensively studied in order to develop the techniques of preparing a resin composition having the high elasticity which hardly generates defects such as hole and breakage when molded into a film and drew and, as a result, found that the aforementioned object can be attained by using the screw kneading apparatus having the aforementioned specific screw design.

A process for preparing a resin composition of the present invention comprises kneading 100 parts by weight of a mixed resin satisfying the following conditions and 10–300 parts by weight of an inorganic filler using a screw kneading apparatus having the aforementioned essential features.

That is, a ratio by weight of polyolefin [A] having a weight average molecular chain length of 2850 nm or larger to polyolefin wax [B] having a weight average molecular weight 700–6000 [A]/[B] is 50/50–90/10.

In the case of a general kneading apparatus which is used for kneading a thermoplastic resin, it was difficult to knead the polyolefin [A] and the polyolefin wax [B] uniformly at the aforementioned ratio. However, by using a screw kneading apparatus of the present invention, a mixed resin obtained by incorporating at the aforementioned ratio can be uniformly kneaded.

By performing kneading under such the conditions, a resin composition having the high elasticity can be obtained, this can be converted into a film and can be further drew to obtain a desired porous film.

As a suitable embodiment of the present invention, there is an embodiment in which the aforementioned mixed resin and the aforementioned inorganic filler are kneaded using the aforementioned kneading apparatus of the present invention under the conditions satisfying the following equation:

$$5 \times 10^4 \leq [E/(D/1000)^3] \leq 3 \times 10^5$$

wherein E is an amount (kg/hr) of a resin discharged from a kneading apparatus, and D is a diameter (mm) of a barrel of a kneading apparatus.

By kneading under such the conditions, a resin composition having the high elasticity can be obtained. A discharge amount is measured as follows:

(1) Take a resin discharged through a die for 36 seconds.

(2) Measure a weight with an electronic balance.

(3) Convert into a discharge amount (kg/hr) per 1 hour.

Figure 1:
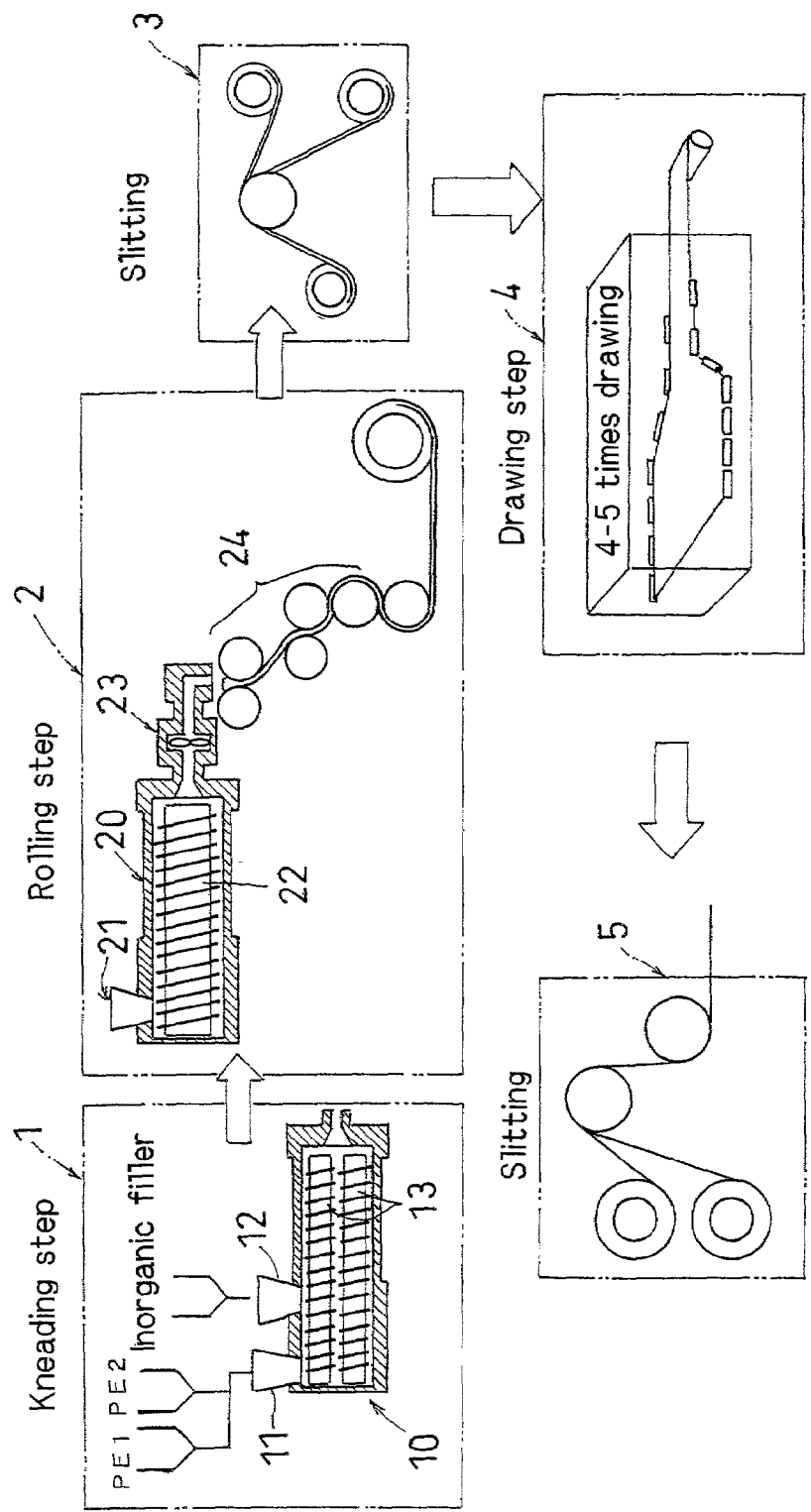
FIG. 1 is a schematic view showing an example of a process for preparing a polyolefin series resin.

DETAILED DESCRIPTION OF THE PREFERRED EMBODIMENTS polyolefin [A] in the present invention is characterized in that a weight average molecular chain length is 2850 nm (28500 Å) or longer. When the weight average molecular chain length is less than 2850 nm, entanglement of molecular chains in polyolefin is insufficient and, when a film is prepared from a composition of the present invention, it is difficult to obtain a high strength and high elasticity film.

polyolefin wax [B] in the present invention is characterized in that it has a weight average molecular weight of 700–6000. When polyolefin wax having a weight average molecular weight of less than 700 is used, in a composition consisting of polyolefin [A] and polyolefin wax [B], both are easily separated, and polyolefin wax is easily bled out from the composition.

When polyolefin wax having a weight average molecular weight of greater than 6000 is used, a melting viscosity at mixing polyolefin [A] and polyolefin wax [B] becomes higher, it is difficult to obtain a uniform composition. And, when a film is prepared from the resulting composition, a part having a low strength or elasticity is locally generated and, thus, it is difficult to obtain a high strength and high elasticity film.

A density $\rho1$ (g/cm$^3$) of polyolefin [A] and a density $\rho2$ (g/cm$^3$) of polyolefin wax [B] in the present invention are characterized in that they satisfy the following conditions:

$$0.92 \leq \rho1 \leq 0.94$$

$$0.91 \leq \rho2 \leq 0.93$$

$$-0.01 \leq (\rho1 - \rho2) \leq 0.03.$$

When the densities $\rho1$ and $\rho2$ do not satisfy the above conditions, polyolefin [A] and polyolefin wax [B] are incompatible and, when a film is prepared from the present composition, a part having a low strength or elasticity is partially generated, thus, it is difficult to obtain a high strength and high elasticity film, being not preferable.

Examples of olefin constituting polyolefin [A] used in the present invention include ethylene, propylene, butene and hexene. In particular, it is preferable to use ultra-high molecular-weight-polyethylene or ultra-high molecular-weight-polypropylene.

Examples of polyolefin wax [B] include waxes of polyethylene series resins such as low density polyethylene, linear polyethylene (ethylene-α-olefin copolymer), high density polyethylene and the like, polypropylene series resins such as polypropylene, ethylene-propylene copolymer and the like, poly(4-methylpentene-1), poly(butene-1) and ethylene-vinyl acetate copolymer.

A molecular chain length, a weight average molecular chain length, a molecular weight and a weight average molecular weight of polyolefin are measured by GPC (gel permeation chromatography), and a mixed ratio (% by weight) of polyolefin in a specific molecular chain length range or a specific molecular weight range can be obtained by integrating a molecular weight distribution curve obtained by GPC measurement.

The composition for preparing a polyolefin series resin film of the present invention may contain various additives or fillers, as necessary. For example, as an additive, an antioxident, an ultraviolet-absorbing agent, a pigment, a dye, an inorganic filler, and an organic filler such as resin fine powders may be contained.

It is preferable that the polyolefin series resin film and the composition for the polyolefin series resin film of the present invention contain 10% by weight or more of a polyolefin series resin having a molecular chain length of 2850 nm or longer. Since a polyolefin series resin having a molecular chain length of 2850 nm or longer is excellent, in particular, in the strength, when such the resin is contained at 10% by weight or more, more preferably 20% by weight or more, a polyolefin series resin film remarkably excellent in the strength can be obtained.

The composition for preparing the polyolefin series resin of the present invention can be obtained by kneading polyolefin [A] and polyolefin wax [B] as a raw material with a kneading apparatus having a high shearing. More particularly, there are exemplified a Banbury mixer, a kneader, a kneading roll, and a screw kneading apparatus used for kneading thermoplastic resins.

When a screw kneading apparatus is used, it is preferable to use an apparatus having a screw of L/D of 30 or greater provided with at least a full flight screw and a kneading block, wherein a kneading block has Ln/D of 5 or greater, a full flight screw has Lf/D of 3 or more, and the following conditional equations are satisfied:

(Conditional Equations)

$$35 \leq \alpha \leq 60$$

$$0.15 \leq (M/D) \leq 0.25,$$

wherein α is a flight angle (°) of a full flight screw, M is a depth (mm) of a screw groove of a full flight screw, L is a screw full length (mm), D is a diameter (mm) of a barrel, Ln is an element length (mm) of a kneading block (provided that, when 2 or more kneading blocks are contained in a screw, a total of element lengths thereof), Lf is an element length (mm) of a full flight screw (provided that when 2 or more full flight screws are contained in a screw, a total of element lengths thereof).

When a screw kneading apparatus is used, it is possible to continuously set a processing step necessary for preparing a film, for example, a calendar processing step and a drawing step after kneading, different from the case where a Banbury mixer or a kneader is used.

According to the previous processing method, when 10–300 parts by weight of an inorganic filler is added to 100 parts by weight of a mixed resin, problems such as melt fracture and formation of rattan blind-like holes are risen and, thus, films having the better membrane thickness precision can not be obtained. However, according to the present method, films which not only have the better membrane thickness precision but also are excellent in the rigidity can be obtained. When an amount of the inorganic filler to be added is less than 10 parts by weight, the amount is insufficient for improving the rigidity. Even when the filler is added at an amount of above 300 parts by weight, the effects of improving the rigidity are low for an addition amount.

As an inorganic filler, calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, almina, mica, zeolite, glass powders and zinc oxide can be used.

Then, embodiments of the present invention will be explained by way of an example using a screw kneading apparatus as a kneading apparatus.

<Process for Preparing a Film>

FIG. 1 is a schematic view showing a preparation line for preparing a polyolefin series resin film. The present preparation line consists of each step of a kneading step 1, a rolling step 2, a first slitting step 3, a drawing step 4 and a second slipping step 5, in a process order.

In a kneading step 1, a screw kneading apparatus 10 is used, and this kneading apparatus is provided with a first hopper 11 for supplying polyolefin PE1 having an average molecular chain length of 2850 nm or longer and polyolefin wax PE2. This kneading apparatus may be provided with a second hopper 12 for supplying an additive such as an inorganic filler. A screw kneading apparatus 10 is provided with a biaxial screw 13, which extrudes a mixed resin supplied from a hopper 11 forwards while strongly kneading the resin. The composition for preparing a polyolefin series resin film obtained by kneading is pelletized.

In a rolling step 2, a screw extruding apparatus 20 is used. This apparatus 20 is provided with a hopper 21 for placing pellets of a resin composition obtained by a kneading step 1, and a screw 22. This apparatus 20 extrudes the resin composition forwards, discharges a bar-like or sheet-like melt resin through a die 23, and the resin is rolled with a rolling machine 24 to obtain a film.

In a first slitting step 3, a film obtained in a rolling step 2 is cut into 2 pieces in a width direction. For example, 2 films having a width of 300 mm are obtained from a film having a width of a 600 mm.

In a drawing step 4, the aforementioned film having a width of 300 mm is drew at a 4–5-times in a width direction under the predetermined temperature conditions. Thereby, a polyolefin series resin film drew in a width direction can be obtained.

In a second slitting step 5, a polyolefin series resin film obtained in a drawing step 4 is cut into a desired width dimension.

<Construction of a Screw of a Screw Kneading Apparatus>

Figure 2:
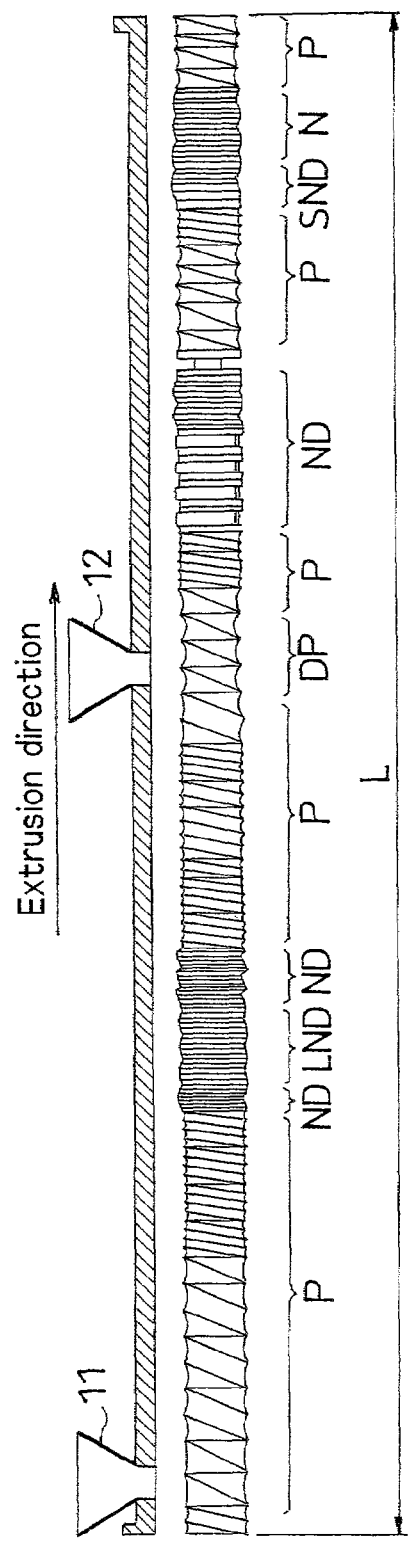
FIG. 2 is a view showing the details of a screw of a screw kneading apparatus.

Then, the details of the construction of a screw 13 kneading apparatus 10 suitable for preparing a composition for preparing a polyolefin series resin film of the present invention will be explained. FIG. 2 shows the details of a screw 13.

The screw 13 is constructed by fixing a part called as an element on an axis called as a screw axis.

Figure 3:
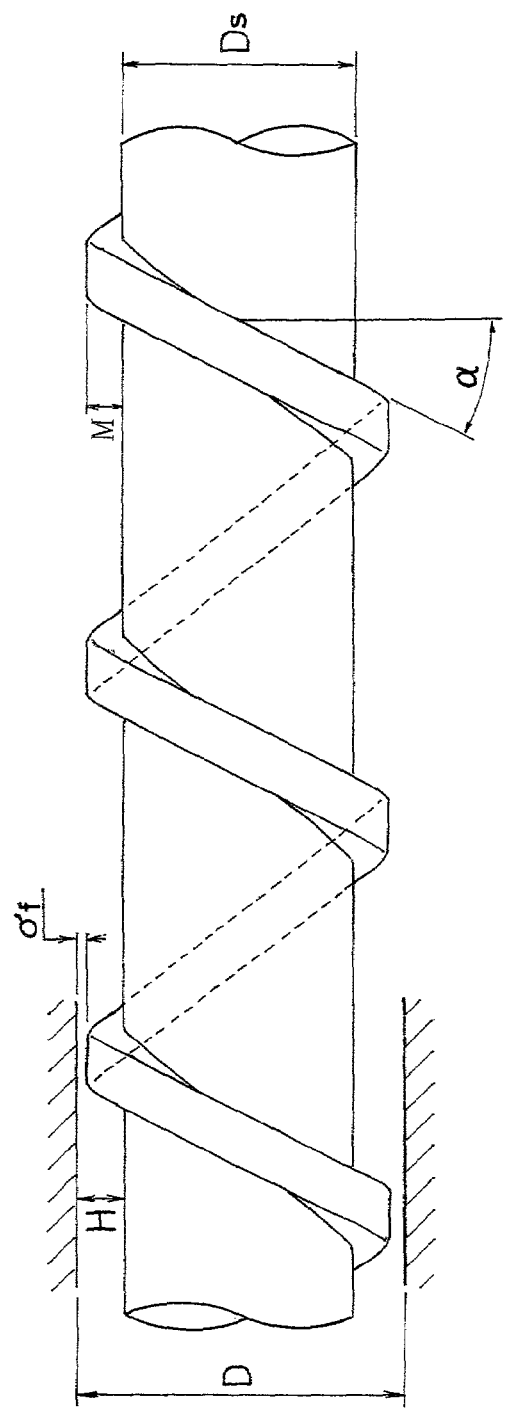
FIG. 3 is a view showing the construction of a full flight disc of a screw kneading apparatus.

In FIG. 2, an element indicated by P is a full flight screw. The full flight screw is a screw segment in which grooves are formed spirally over its full length. An element indicated by DP shows a full flight screw in which deeper grooves than those of a full flight screw indicated by P are formed. By using a full flight screw having such the deeper grooves, a residence time of a resin can be extended. A full flight screw has a shape shown in FIG. 3 and has usually a role in supplying kneading materials forwards, that is, downstream of a kneading apparatus. In FIG. 3, D is a diameter (inner diameter) (mm) of a barrel, Ds is a diameter (mm) of a screw, M is a depth (mm) of a screw groove, α is a flight angle (°) of a screw, H is a distance (mm) between a barrel inner surface and a bottom of a screw groove, and σf is a distance (mm) between a screw flight and a barrel inner surface.

Among the aforementioned parameters, α relates to a speed at which a resin is supplied. As α grows smaller, a speed at which resin is supplied is slower. As a result, a residence time of a resin becomes longer and, thus, the kneading degree of a resin is improved, provided that when α is too small, the productivity is deteriorated. A magnitude of M is a parameter relating to a speed at which a resin is supplied and a kneading strength.

Figure 4:
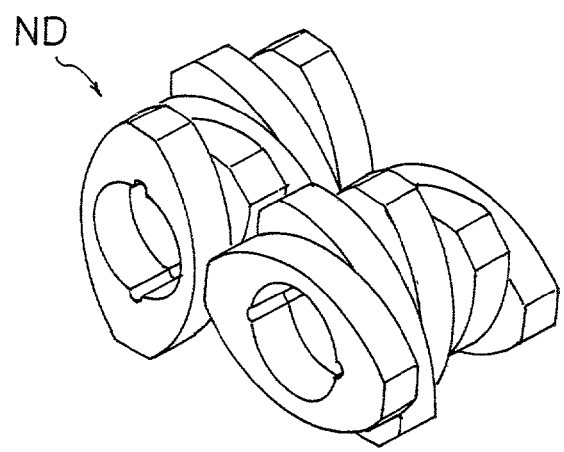
FIG. 4 is a view showing the construction of a kneading disc of a screw kneading apparatus.
Figure 4:
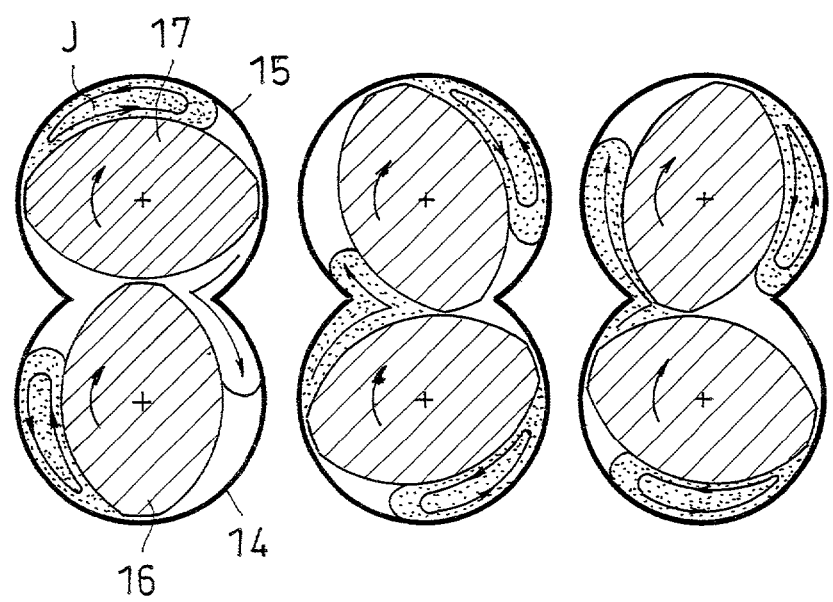

An element indicated by ND is a kneading block. The kneading block has usually such a shape geometrical centers of a plurality of kneading discs having the same cross-sectional shape are positioned on a common straight line and the discs are piled in a prescribed direction and at a pre-scribed angle bias around the straight line as shown in FIG. 4. Respective kneading discs may have the same or different thickness.

In the state where a screw is provided in a barrel, a distance between a kneading disc constituting a kneading block and a barrel has a distribution, and the strongest shearing force is exerted on a kneading material at a place where that distance becomes the smallest.

An element indicated by LND is a kneading block having such a shape that kneading discs are piled so as to be distorted in a reverse direction to that of a distortion of piling of kneading discs in the kneading block indicated by ND. By using a combination of two kinds of kneading blocks ND and LND, a residence time of a kneading material can be longer as compared with the case of one kind of a kneading block and, thus, a stronger shearing force can be imparted.

An element indicated by a symbol SND is also a kneading block. The characteristic thereof is that a kneading disc downstream of a kneading apparatus is thinner than an upstream kneading disc when adjacent kneading discs are compared. By using such the kneading block SND, a flowing rate towards downstream of a kneading material can be adjusted, and a stronger compression and elongation action can be imparted on a kneading material.

FIGS. 4(a) and (b) are a view showing a kneading block in the state where it is provided in a biaxial extruder (a screw axis is omitted). FIG. 4(b) shows motion of a resin J accompanied by movements of kneading discs 16 and 17 in barrels 14 and 15.

In a screw kneading apparatus suitable for preparing a composition for preparing a polyolefin series resin film of the present invention, L/D of a whole screw is set at 30 or more, Ln/D of a kneading block is set at 5 or more, and Lf/D of a full flight screw is set at 3 or more. Further, in a full flight screw, parameters are designed so as to be $35 \leq \alpha \leq 60$ and $0.15 \leq (M/D) \leq 0.25$. As L/D grows larger, a residence time becomes longer. Here, Ln is an element length (mm) of a kneading block (provided that, when 2 or more kneading blocks are contained in a screw, a total of the element lengths), Lf is an element length (mm) of a full flight screw (provided that, when 2 or more of full flight screws are contained in a screw, a total of the element lengths).

By selecting parameters as described above, there can be obtained a polyolefin series resin composition which can afford a high elasticity film by molding into a film.

When a mixed resin and the aforementioned inorganic filler are kneaded using a screw kneading apparatus having the aforementioned construction, kneading is preferably performed under the conditions satisfying the following equation:

$$5 \times 10^4 \leq [E/(D/1000)^3] \leq 3 \times 10^5$$

wherein E is an amount (kg/hr) of a resin composition discharged from a kneading apparatus, and D is a diameter (mm) of a barrel of a kneading apparatus. Thereby, a resin composition having the high elasticity can be obtained. A discharge amount E is a parameter showing what an amount of a resin is extruded forwards in the interior of a barrel in a kneading apparatus.

Although a kneading apparatus of the present invention is most preferably of a biaxial screw comprising two screws composed of the entirely same screw elements, untaxed screw or 3 or more screws may be used as long as the requirements of the present invention are satisfied.

In a kneading apparatus composed of 2 or more screws, a so-called fitting type is the most preferable in which rotation directions of screws are the same, a distance between axial centers is shorter than a sum of largest diameters of screw elements, and a convex and a concave part of each screw element are fitted as shown in FIG. 4. However, a so-called non-fitting type screw format may be used in which rotation directions are the same and a distance between axial centers is larger than a sum of largest diameters of screw elements. Alternatively, a non-fitting type screw format in which rotation directions of 2 or more screws are different may be used.

What is claimed is:

1. A polyolefin series resin film comprising
polyolefin and
polyolefin wax
wherein
the polyolefin [A] has a weight average molecular chain length of 2850 nm or longer and a density $\rho 1$ (g/cm$^3$),
the polyolefin wax [B] has a weight average molecular weight of 700–6000 and a density $\rho 2$ (g/cm$^3$),
the polyolefin and the polyolefin wax are incorporated at [A]/[B]=90/10–50/50 (ratio by weight), and
the densities $\rho 1$ and $\rho 2$ satisfy the following conditions:

$$0.92 \leq \rho 1 \leq 0.94$$

$$0.91 \leq \rho 2 \leq 0.93$$

$$-0.01 \leq (\rho 1 - \rho 2) \leq 0.03.$$

2. The polyolefin series resin film according to claim 1, wherein the polyolefin is selected from the group consisting of ultra-high molecular-weight-polyethylene and ultra-high molecular-weight polypropylene, and
the polyolefin wax is selected from the group consisting of low density polyethylene, linear polyethylene (ethylene-α-olefin copolymer), polypropylene, ethylene-propylene copolymer, poly(4-methylpentene-1), poly (butene-1) and ethylene-vinyl acetate copolymer.

3. The polyolefin series resin film according to claim 1, wherein the polyolefin series resin is contained at an amount of at least 10% by weight.

4. A composition for preparing a polyolefin series resin film comprising polyolefin and polyolefin wax, wherein
the polyolefin [A] has a weight average molecular chain length of 2850 nm or longer and a density $\rho 1$ (g/cm$^3$),
the polyolefin wax [B] has a weight average molecular weight of 700–6000 and a density $\rho 2$ (g/cm$^3$),
the polyolefin and the polyolefin wax are incorporated at [A]/[B]=90/10–50/50 (ratio by weight), and
the densities $\rho 1$ and $\rho 2$ satisfy the following conditions:

$$0.92 \leq \rho 1 \leq 0.94$$

$$0.91 \leq \rho 2 \leq 0.93$$

$$-0.01 \leq (\rho 1 - \rho 2) \leq 0.03.$$

5. The composition for preparing a polyolefin series resin film according to claim 4, wherein
the polyolefin is selected from the group consisting of ultra-high molecular-weight-polyethylene and ultra-high molecular-weight polypropylene, and
the polyolefin wax is selected from the group consisting of low density polyethylene, linear (ethylene-α-olefin copolymer), polypropylene, ethylene-propylene copolymer, poly(4-methylpentene-1), poly(butene-1) and ethylene-vinyl acetate copolymer.

6. The composition for preparing a polyolefin series resin film according to claim 4, wherein the polyolefin series resin is contained at an amount of at least 10% by weight.

7. A process for preparing a composition for preparing a polyolefin series resin film comprising steps of kneading a polyolefin series resin composition, using a screw kneading apparatus, wherein
the polyolefin series resin composition satisfies the following conditions:
polyolefin [A] having a weight average molecular chain length of 2850 nm or longer and a density $\rho 1$ (g/cm$^3$), and
polyolefin wax [B] having a weight average molecular weight of 700–6000 and a density $\rho 2$ (g/cm$^3$) are incorporated at [A]/[B]=90/10–50/50 (ratio by weight), and
the densities $\rho 1$ and $\rho 2$ satisfy the following conditions:

$$0.92 \leq \rho 1 \leq 0.94$$

$$0.91 \leq \rho 2 \leq 0.93$$

$$-0.01 \leq (\rho 1 - \rho 2) \leq 0.03.$$

8. The process for preparing a composition for preparing a polyolefin series resin film comprising steps of kneading 100 parts by weight of a mixed resin and 10–300 parts by weight of an inorganic filler using a screw kneading apparatus, wherein:
the mixed resin satisfies the following conditions;
polyolefin [A] having a weight average molecular chain length of 2850 nm or longer, and
polyolefin wax [B] having a weight average molecular weight 700–6000 are incorporated at [A]/[B]=90/ 10–50/50 (ratio by weight), and the mixed resin and the inorganic filler are kneaded under the conditions satisfying the following equation:

$$5 \times 10^4 \leq [E/(D/1000)^3] \leq 3 \times 10^5$$

wherein E is an amount (kg/hr) of a resin composition discharged from a kneading apparatus, and D is a diameter (mm) of a barrel of a kneading apparatus.

9. The process for preparing a composition for preparing a polyolefin series resin film according to claim 8, comprising of:
   the screw kneading apparatus comprising:
   a barrel, and
   a screw,
   said screw being provided in the barrel, being provided with at least a full flight screw and a kneading block, and having L/D of 30 or more,
   wherein the kneading block has Ln/D of 5 or more,
   the full flight screw has Lf/D of 3 or more, and satisfies the following equation:

$$35 \leq \alpha \leq 60$$

$$0.15 \leq (M/D) \leq 0.25$$

wherein $\alpha$ is a flight angle (°) of a full flight screw, M is a depth (mm) of a screw groove of a full flight screw, L is a screw full length (mm), Ln is a total length (mm) of a kneading block, Lf is a total length (mm) of a full flight screw, D is a diameter (mm) of a barrel.

10. A process for preparing a polyolefin series resin film comprising steps of:
   kneading a polyolefin series resin composition using a screw kneading apparatus,
   rolling the kneaded polyolefin series resin composition, and
   drawing the rolled polyolefin series resin composition, wherein:
   the polyolefin series resin composition satisfies the following conditions:
   polyolefin [A] having a weight average molecular chain length of 2850 nm or longer and a density $\rho 1$ (g/cm$^3$), and
   polyolefin wax [B] having a weight average molecular weight of 700–6000 and a density $\rho 2$ (g/cm$^3$) are incorporated at [A]/[B]=90/10–50/50 (ratio by weight), and
   the densities $\rho 1$ and $\rho 2$ satisfy the following condition:

$$0.92 \leq \rho 1 \leq 0.94$$

$$0.91 \leq \rho 2 \leq 0.93$$

$$-0.01 \leq (\rho 1 - \rho 2) \leq 0.03.$$

* * * * *